T. N. REID.
Baker's Oven.
No. 8,960.
Patented May 18, 1852.
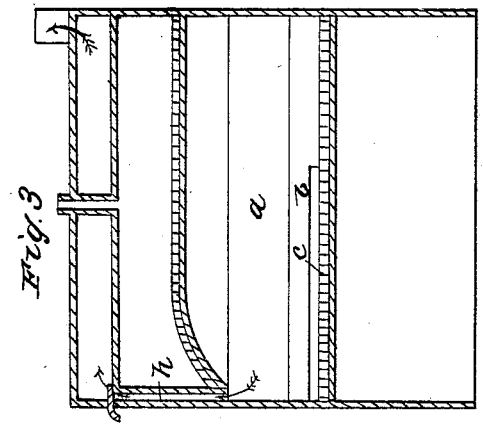
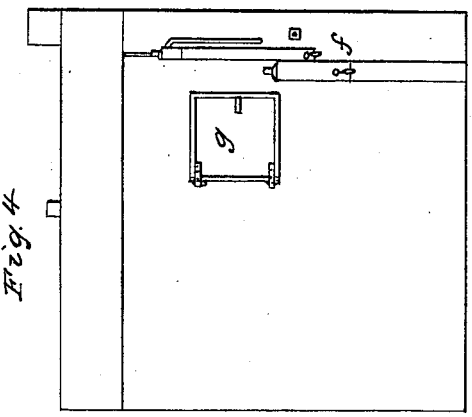
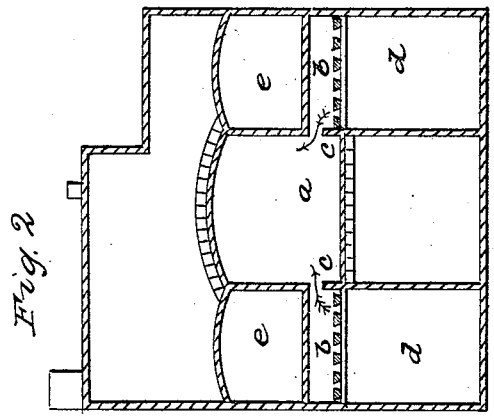
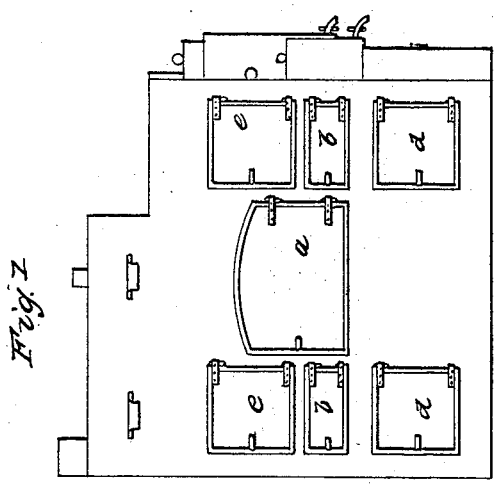

UNITED STATES PATENT OFFICE.

THOS. N. REID, OF BALTIMORE, MARYLAND.

OVEN.

Specification of Letters Patent No. 8,960, dated May 18, 1852.

*To all whom it may concern:*

Be it known that I, THOMAS N. REID, of Baltimore and State of Maryland, have invented certain new and useful Improvements in Ovens and Cooking Apparatus Connected Therewith, and that the following is a full, clear, and exact description of the principle or character which distinguishes them from all other things before known, and of the usual manner of making, modifying, and using the same, reference being had to the accompanying drawing, in which—

Figure 1, is a front elevation. Fig. 2, is a vertical cross section. Fig. 3, a section longitudinal. Fig. 4, a side elevation.

My invention consists in furnishing an oven, with all the characteristics of a baker's oven, with the addition of such fixtures as are necessary for cooking, heating water and air for household purposes. The utility of an oven of brick, such as used by professional bakers, heated conveniently, need not here be enumerated, while the advantages of combining therewith cooking apparatus for domestic use are incalculable.

I form a brick oven, of ordinary shape, shown at ($a$) in the drawing, on either side of which there is a recess ($b$), partitioned off from the main oven by the iron plates ($c$); these recesses have each a grated bottom, on which fuel is to be placed, with an ash pit ($d$) below; above this fire-chamber, thus formed, there is a cast iron chamber ($e$), from which the arch of the top of the oven springs, as clearly shown in section Fig. 2; at the rear of the fire chamber there are boilers set, with one side in the fire chamber, the other projecting at ($f$) beyond the side; these supply water for any domestic purpose; and there may be in the floor of chamber ($e$,) boiler holes, if desired; there should be an additional door into this chamber in the side, at ($g$,); over the oven arch I place an air heating chamber, to heat the apartments with the waste heat from the oven. The partition ($c$), before named, between the pan and oven, extends back as far as the grate, or about half way of the oven, more or less thus permitting the products of combustion from the fire to pass through the oven, and up a flue ($h$,) in front, as in bakers' ovens, and producing like effects, while at the same time the cooking can go on as when the oven is not in use.

Having thus fully described my improved oven, with cooking apparatus attached, what I claim therein as my invention, and desire to secure by Letters Patent, is—

The construction of said oven, with recesses on the side or sides for fuel, substantially as set forth above; and in combination therewith the cooking chambers, as herein described.

THOMAS N. REID.

Witnesses:
WM. PINKNEY WHYTE,
WM. E. BEALE.